(12) United States Patent
Liu

(10) Patent No.: US 9,224,189 B2
(45) Date of Patent: Dec. 29, 2015

(54) METHOD AND APPARATUS FOR COMBINING PANORAMIC IMAGE

(75) Inventor: Dongmei Liu, Shenzhen (CN)

(73) Assignee: ZTE CORPORATION (CN)

( * ) Notice: Subject to any disclaimer, the term of this patent is extended or adjusted under 35 U.S.C. 154(b) by 39 days.

(21) Appl. No.: 13/882,273

(22) PCT Filed: Apr. 14, 2011

(86) PCT No.: PCT/CN2011/072820
§ 371 (c)(1),
(2), (4) Date: Apr. 29, 2013

(87) PCT Pub. No.: WO2012/058902
PCT Pub. Date: May 10, 2012

(65) Prior Publication Data
US 2013/0208997 A1 Aug. 15, 2013

(30) Foreign Application Priority Data
Nov. 2, 2010 (CN) .......................... 2010 1 0528052

(51) Int. Cl.
*G06K 9/36* (2006.01)
*G06T 3/20* (2006.01)
*G06T 3/40* (2006.01)
*G06T 7/00* (2006.01)

(52) U.S. Cl.
CPC ................ *G06T 3/20* (2013.01); *G06T 3/4038* (2013.01); *G06T 7/0028* (2013.01); *G06T 2200/32* (2013.01)

(58) Field of Classification Search
None
See application file for complete search history.

(56) References Cited

U.S. PATENT DOCUMENTS

| | | | | |
|---|---|---|---|---|
| 5,982,951 A | * | 11/1999 | Katayama et al. | 382/284 |
| 7,010,152 B2 | * | 3/2006 | Bojer et al. | 382/132 |
| 7,406,213 B2 | * | 7/2008 | Hasegawa | 382/284 |

(Continued)

FOREIGN PATENT DOCUMENTS

| | | |
|---|---|---|
| CN | 101276465 A | 10/2008 |
| CN | 101556692 A | 10/2009 |
| CN | 101984463 A | 3/2011 |

OTHER PUBLICATIONS

Guandong, Gao, and Jia Kebin. "A new image mosaics algorithm based on feature points matching." Innovative Computing, Information and Control, 2007. ICICIC'07. Second International Conference on. IEEE, 2007.*

(Continued)

*Primary Examiner* — Li Liu
(74) *Attorney, Agent, or Firm* — Cantor Colburn LLP

(57) ABSTRACT

The disclosure discloses a method and an apparatus for combining panoramic image. The method includes: obtaining multiple original images of the same scene, performing folding change and coordinates transformation to the multiple original images, and determining an overlapping area of the multiple original images; establishing a mathematical model of the multiple original images, aligning the overlapping area of the multiple original images, and transforming the multiple original images to a coordinate system of a reference image; obtaining the space transformation relationship among/between the multiple original images according to the coordinate system of the reference image, selecting an appropriate image combining strategy, and completing the combining of the images. The solution can realize obtaining scene picture with large field of view without reducing image resolution.

16 Claims, 4 Drawing Sheets

(56) References Cited

U.S. PATENT DOCUMENTS

| | | | |
|---|---|---|---|
| 7,813,589 B2* | 10/2010 | Silverstein et al. | 382/284 |
| 8,755,624 B2* | 6/2014 | Suk et al. | 382/255 |
| 8,831,382 B2* | 9/2014 | Tolstaya | 382/294 |
| 2002/0114536 A1* | 8/2002 | Xiong et al. | 382/284 |
| 2005/0063608 A1* | 3/2005 | Clarke et al. | 382/284 |
| 2008/0232715 A1* | 9/2008 | Miyakawa et al. | 382/284 |
| 2009/0141043 A1* | 6/2009 | Guo et al. | 345/629 |
| 2011/0316963 A1* | 12/2011 | Li et al. | 348/14.1 |
| 2013/0208997 A1 | 8/2013 | Liu | |

OTHER PUBLICATIONS

Behrens, Alexander. "Creating panoramic images for bladder fluorescence endoscopy." Acta Polytechnica 48.3 (2008).*

International Search report for corresponding application No. PCT/CN2011/072820 filed Apr. 14, 2011; Mail date Jul. 14, 2011.

Chu-Song Chen, Ransac-Based Darces: A New Approach to Fast Automatic Registration of Partially Overlapping Range Images, IEEE Transactions of Pattern Analysis and Machine Intelligence, vol. 21, No. 11, Nov. 1999, pp. 1229-1234, XP-000897104.

Ezzeddine Zagrouba, "An efficient image-mosaicing method based on multi-feature matching", Machine Vision and Applications (2009) 20: 139-162.

Gao Guandong, "A New Image Mosaics Algorithm Based on Feature Points Matching", College of Electronic Information and Control Engineering, 2007 IEEE.

Tomakazu Sato, "High-resolution Video Mosaicing for Documents and Photos by Estimating Camera Motion", Computational Imaging II, 246 (May 21, 2004), XP-002723124.

European Search Report for corresponding application EP 11 83 7430; Report Dated Apr. 10, 2014.

* cited by examiner

METHOD AND APPARATUS FOR COMBINING PANORAMIC IMAGE

FIELD OF THE INVENTION

The disclosure relates to the technology of combining image, and in particular to a method and an apparatus for combining panoramic image.

BACKGROUND OF THE INVENTION

At present, with the rapid development of mobile device, various functions of mobile device become more and more user-friendly. However, the current camera of mobile device can only realize the taking of a single picture. When using the common camera of mobile device to obtain scene image in the view, the complete scene can be photographed only by zooming to change the focal length of camera. The resolution of a camera is fixed. The larger the photographed scene is, the lower the resolution is. Thus, the resolution of a picture taken by the above method can be very low. For obtaining scene picture with high resolution, camera needs to be zoomed to reduce the field of view to be photographed, but doing so means that the complete scene picture cannot be obtained.

In the above case, although the users can obtain the panoramic image of the scene by directly using a special camera to photograph, expensive hardware is needed, which is not applicable to common users.

When the users use the camera of mobile device, if the common users want to take a panoramic picture, they can only take a single panoramic picture with low resolution, or take multiple non-panoramic pictures with high resolution. This cannot meet the demands of users in the above case. Thus, the related art has the problem that picture with high resolution and large field of view cannot be obtained due to limitation of visual angle and size of camera of mobile device.

SUMMARY OF THE INVENTION

The disclosure provides a method and an apparatus for combining panoramic image. This solution can solve the problem of the related art that picture with high resolution and large field of view cannot be obtained due to limitation of visual angle and size of camera of mobile device.

For solving the above technical problem, the following technical solutions are provided.

A method for combining panoramic image, applied to a camera of a mobile device is provided, which includes:

obtaining multiple original images of a same scene, performing folding change and coordinates transformation to the multiple original images, and determining an overlapping area of the multiple original images;

establishing a mathematical model of the multiple original images, aligning the overlapping area of the multiple original images, and transforming the multiple original images to a coordinate system of a reference image; and obtaining a space transformation relationship among/between the multiple original images according to the coordinate system of the reference image, selecting an image combining strategy, and completing the combining of the images.

An apparatus for combining panoramic image, configured in a camera of a mobile device is provided, which includes:

an image obtaining module, configured to obtain multiple original images of a same scene;

an image pre-processing module, configured to perform folding change and coordinates transformation to the multiple original images, and determine an overlapping area of the multiple original images;

an image registration module, configured to establish a mathematical model of the multiple original images, align the overlapping area of the multiple original images, and transform the multiple original images to a coordinate system of a reference image; and an image combining module, configured to obtain a space transformation relationship among/between the multiple original images according to the coordinate system of the reference image, select an image combining strategy, and complete the combining of the images.

The disclosure has the following beneficial effects:

by performing operations like registration to multiple single images to combine a series of single images into a panoramic image, the problem of the related art that picture with high resolution and large field of view cannot be obtained due to the limitation of visual angle and the size of camera of mobile device is solved; and scene picture with large field of view can be obtained without reducing image resolution; and embodiments of the disclosure use the processor of the camera to perform automatic matching to construct a seamless and high-definition image which has higher resolution and larger field of view than single image, so that the demands of users of mobile device can be better satisfied.

DETAILED DESCRIPTION OF THE EMBODIMENTS

For solving the problem of the related art that the picture with high resolution and large field of view cannot be obtained due to the limitation of visual angle and the size of camera of mobile device, the disclosure provides a method and an apparatus for combining panoramic image. This solution performs panoramic stitching to pictures with different sizes taken at different angles through the camera of mobile device, performs space matching and aligning to a group of image sequences with mutual overlapped parts, and after sampling and combining, forms a complete and high-definition new image of wide visual scene. The disclosure is described below in detail with reference to the drawings and the embodiments. It should be understood that specific embodiments described herein are only used for illustrating the disclosure and are not intended to limit the disclosure.

Apparatus Embodiments

Figure 1:
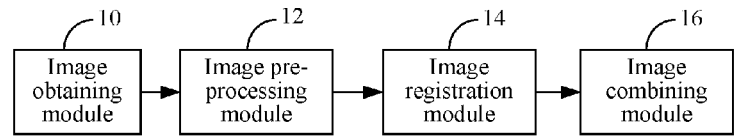
FIG. 1 shows a structure diagram of an apparatus for combining panoramic image according to an embodiment of the disclosure.

According to an embodiment of the disclosure, an apparatus for combining panoramic image is provided. The apparatus is provided in a camera of a mobile device. FIG. 1 shows a structure diagram of an apparatus for combining panoramic image according to an embodiment of the disclosure. As shown in FIG. 1, the apparatus for combining panoramic image according to the embodiment of the disclosure includes: the image obtaining module 10, the image pre-processing module 12, the image registration module 14 and the image combining module 16. The above modules are described below in detail.

Figure 2:
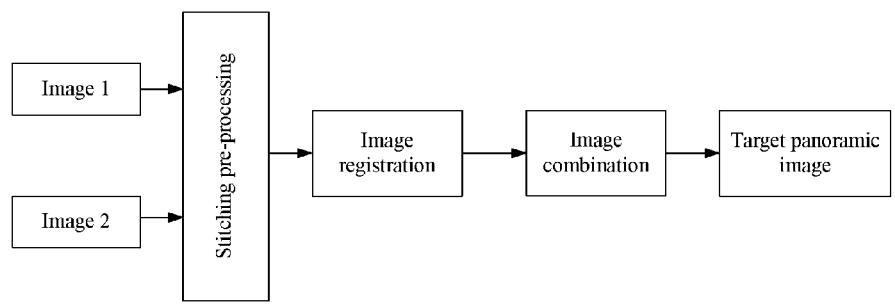
FIG. 2 shows a diagram of a flow of stitching panoramic image according to an embodiment of the disclosure.

FIG. 2 shows a diagram of a flow of stitching panoramic image according to an embodiment of the disclosure. As shown in FIG. 2, after obtaining image 1 and image 2, the image obtaining module 10 sends them to the image pre-processing module 12 for stitching pre-processing. Then, the image registration module 14 performs image registration, and the image combining module 16 combines the images. Finally, a target panoramic image is obtained.

It can be seen from the diagram of the flow of stitching panoramic image shown in FIG. 2 that the first step of image processing is obtaining the images. The image obtaining module 10 is configured to obtain multiple original images of the same scene. That is to say, the image obtaining module 10 is mainly configured to obtain the picture to be taken. For achieving the purpose of obtaining images, the corresponding camera device, including a camera and a drive, is needed. After turning on the camera, the image information acquired by the camera is transmitted to the image pre-processing module 12. Then, the image pre-processing module 12 performs analytical processing to the acquired image information to verify the image information. It should be noted that in practical application, since different ways of acquiring image will cause different input original images, the finally-used image stitching method will also be different.

Image pre-processing aims to ensure the accuracy of image registration. The image pre-processing module 12 is configured to perform folding change and coordinates transformation to the multiple original images, and to determine an overlapping area of the multiple original images. Specifically, the image pre-processing module 12 performs basic image processing operations to the multiple original images, establishes a matching template of the images, performs predetermined transformation to the images, extracts a set of feature points of the images, and determines the overlapping area of the multiple original images. The basic image processing operations include: histogram processing and smooth filtering of image. The predetermined transformation includes at least one of the following: the Fourier transformation, the wavelet transformation, and the Gabor transformation.

That is to say, the image pre-processing module 12 needs to perform some folding change and coordinates transformation to the original images. This includes the basic image processing operations (e.g., histogram processing, smooth filtering of image etc.), the operations of establishing the matching template of the images, performing a certain transformation (e.g. the Fourier transformation, the wavelet transformation, the Gabor transformation etc.), extracting a set of feature points of the images etc. The image pre-processing module 12 performs rough locating to find an approximate overlapping area, so as to reduce the range of matching and improve the image combining speed.

The quality of stitching images depends mainly on the accuracy of image registration. The image registration module 14 is configured to establish the mathematical model of the multiple original images, align the overlapping area of the multiple original images, and transform the multiple original images to the coordinate system of the reference image.

The core objective of image registration is to search for a transformation, and find the corresponding position of the template or the feature points of the images to be stitched in the reference image. According to the template or the correspondence between features of the images, the values of the parameters in the mathematical model can be calculated, thereby establishing the mathematical model of two images, aligning the mutual overlapped parts of the images, and transforming the images to be stitched to the coordinate system of the reference image. Thus, a complete image can be constructed. The key of accurate registration is the mathematical model which can accurately describe the transformation relationship between the two images.

The image registration module 14 determines the transformation parameters among the images according to the similarity measure, so as to transform two or more images of the same scene, which are obtained from different sensors, at different visual angles and at different time, to the same coordinate system. This is a process to find the best matching on the pixel level. The specific implementing method is that: the embodiments of the disclosure first improve the Harris corner detection algorithm, so as to effectively improve the speed and accuracy of extracting the feature points; then this solution uses the similarity measure Normalized Cross Correlation (NCC) to extract the initial feature point pairs through the Bidirectional Greatest Correlative Coefficient (BGCC) matching algorithm, and gets rid of the pseudo feature point pairs through the RANSAC algorithm, so as to realize the exact matching of the feature point pairs; and at last, this solution realizes the image registration according to the exactly matching feature point pairs.

Figure 3:
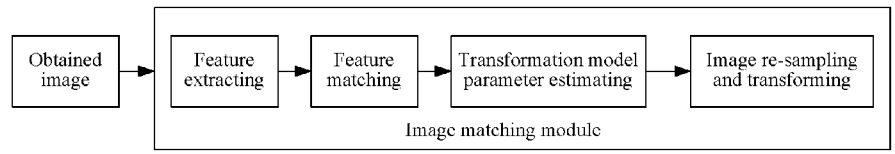
FIG. 3 shows a diagram of process flow of an image registration module according to an embodiment of the disclosure.

FIG. 3 shows a diagram of process flow of an image registration module according to an embodiment of the disclosure. As shown in FIG. 3, the image registration module 14 needs to perform feature extracting, feature matching, transformation model parameter estimating, image re-sampling and transforming, and other operations to the obtained images. The operations of the image registration module 14 are described below in detail.

The image registration module 14 specifically includes: an establishing sub-module, a first extracting sub-module, a second extracting sub-module, an obtaining sub-module and a transforming sub-module.

The establishing sub-module is configured to obtain corresponding position of the matching template or the set of feature points of the multiple original images in the reference image, calculate each parameter value in the mathematical model according to the position, and establish the mathematical cal model of the multiple original images.

The first extracting sub-module is configured to extract the feature points of the multiple original images in a specific way. That is to say, the first extracting sub-module can extract the geometric feature or the grey level feature applicable to the image registration according to the image attribute. Preferably, the feature points are corners in the embodiments of the disclosure.

In the related art, the corner detection algorithm is mainly divided into two types of extracting algorithms based on edge and grey level respectively. Because the extracting algorithm based on edge always depends on extraction of the edge, if an error occurs on the detected edge or the edge line is broken, then the result of extracting the corners is greatly affected. The extracting algorithm based on grey level achieves the purpose of detecting by calculating the extreme points with dramatically changing grey level and gradient in a local scope, without the need of extracting the edge. Hence, it is widely applied in practice. In the related art, the commonly used corner detection methods include the Moravec operator corner detection, the Forstner operator corner detection, the Susan detection algorithm, and the Harris corner detection algorithm. In the above, the Harris corner detection algorithm has excellent performance in consistency and validity, and the interest point extracted through the Harris corner detection algorithm is proved to have rotation invariance, translation invariance, good stability and other advantages.

The Harris corner detection algorithm determines the corners through the variance rate of gray level of image. The algorithm determines whether a point is a corner by calculating the feature value of a matrix M which is correlated with the autocorrelation function of the image, namely the first curvature of the autocorrelation function. If both of the two curvature values are high, then the point is regarded as a corner.

The Harris corner detection algorithm defines the autocorrelation value E(u,v) in any direction as:

$$E(u, v) \cong [u \quad v] M \begin{bmatrix} u \\ v \end{bmatrix}, \quad \text{(formula 1)}$$

$$M = \begin{bmatrix} A & C \\ C & B \end{bmatrix} = e^{-\frac{x^2+y^2}{2\sigma^2}} \otimes \begin{bmatrix} I_x^2 & I_x I_y \\ I_x I_y & I_y^2 \end{bmatrix}, \quad \text{(formula 2)}$$

wherein $I_x$ and $I_y$ are the gradient values of the image in x direction and y direction respectively, w(x,y) is Gaussian filer, and $\otimes$ represents the convolution operation. M is a 2×2 symmetric matrix, so that there must be two feature values $\lambda_1$ and $\lambda_2$. The feature value reflects the feature of the image pixel. That is to say, if the point (x,y) is a feature point, two feature values of M matrix about the point are positive, and they are the local maximum in an area centring on point (x,y). The feature point can be expressed by the evaluation function as:

$$R = \text{Det}(M) - k\text{Trace}^2(M) \quad \text{(formula 3)},$$

wherein $\text{Det}(M)=\lambda_1\lambda_2$, $\text{Trace}(M)=\lambda_1+\lambda_2$, Det is a determinant of the matrix, Trace is the trace of the matrix (sum of the diagonal elements of the matrix), and k is a trial value, usually ranging from 0.04 to 0.06. A reasonable threshold T is set. When the actual R value calculated through formula 3 is greater than the threshold, it indicates that a corner is found; otherwise, no corner is found. The feature point is usually a pixel corresponding to the maximum interest value in a local area. Hence, after calculating the R value of each point, it is required to perform non-maximum suppression, and extract all the points with the maximum local interest values in the original images.

It can be seen from the above process of Harris corner detection that the original Harris corner detection method in the related art is disadvantaged in setting a single threshold, low location accuracy and poor real-time performance etc. The embodiments of the disclosure improve the Harris corner detection algorithm in the related art, extract as many feature points with accurate location as possible in the images, and improve the speed of extracting the corners.

Specifically, the Harris corner detection algorithm improved by the embodiments of the disclosure includes the following processing.

Step 1: calculating the lateral first derivative and the longitudinal first derivative of each point in the image and calculating the product of the lateral first derivative and the longitudinal first derivative to obtain three new images; and during image processing, performing convolution with the original image by using a 3×3 convolution kernel to obtain the partial derivative of each point of the original image. In practical application, for reducing the influence of image noise on extracting the corners, the Gaussian filtering can be performed to the three images.

Step 2: calculating the R value of each corresponding pixel on the original image according to the corner response function formula. The k value in the corner response function formula of the original Harris corner detection algorithm is an empirical constant, and differs greatly in use. This decreases the reliability of extracting the corners, and easily influences the accuracy of extracting the corners when the conditions of the images are different. In view of the characteristic that the R value is actually a corner detection signal, and if value of determinant is great and value of trace is small, it is a corner signal, otherwise, it is an edge signal, the embodiments of the disclosure use the following ratio method to calculate the corner response function formula:

$$R = \frac{\text{Det}(M)}{\text{Trace}(M) + \varepsilon}. \quad \text{(formula 4)}$$

For avoiding that the trace of matrix may be zero sometimes, a very small number $\epsilon$ is added in the denominator. Compared with the response function in the original Harris corner detection algorithm, it avoids the selection of parameter k, decreases the randomness of the selection of k, and has advantages of high practicability, good reliability and high accuracy.

Step 3: selecting local extreme point.

The method in the related art is: selecting a proper threshold, then taking the pixels whose interest values are greater than the threshold as the feature pixels, and filtering the pixels whose interest values are less than the threshold. Although the above processing is simple and easy to realize, the selection of a single threshold may cause that part of the feature points are also filtered out for non-homogeneous images.

For overcoming the defect, the embodiments of the disclosure perform the screening of feature points in a manner of non-maximum suppression in the window of the image in combination with setting the threshold. The specific steps include: selecting a proper window in the original image, retaining the pixels with the maximum interest values in the window, deleting the other pixels in the window, and moving the window to perform screening on the whole original image. There are usually many local extreme points, and thus a reasonable threshold is set according to requirement. Several points with the maximum interest values are selected as the final result. In addition, for improving the speed of extracting, a boundary template can be utilized to remove the corners on boundary which are not effective for matching.

Step 4: locating the corners of sub-pixel level. In the embodiments of the disclosure, the sub-pixel level exact location of the corner is determined by approaching the corner response function R through the quadratic polynomial of $ax^2+by^2+cxy+dx+ey+f=R(x,y)$. An over-determined set of simultaneous equations including 6 unknowns from a to f can be established by the pixels around the detected corner. The over-determined set of simultaneous equations is solved with the least-square method. The corner of sub-pixel level corresponds to the maximum point of the quadratic polynomial.

Table 1 shows comparison of using different methods to extract the corners.

TABLE 1

| Extracting algorithm | Number of extracted corners | Result of extracting the corners | Time of extracting the corners |
| --- | --- | --- | --- |
| Extracting algorithm without threshold | 368 | Many wrong corners are extracted | 0.688 |
| Original Harris corner detection algorithm | 156 | Non-uniform corners are extracted, and some corners are missed out | 1.125 |
| Harris corner detection algorithm improved by the disclosure | 136 | Uniform corners are extracted, and few wrong corners are extracted | 0.25 |

It can be seen from Table 1 that the Harris corner detection algorithm improved by the embodiments of the disclosure improves both the calculating speed and the subsequent match ratio compared with the extracting algorithm without threshold, and improves the time compared with the original Harris corner detection algorithm. Compared with the other two algorithms, the performance of the corners extracted through the Harris corner detection algorithm improved by the disclosure is better, and the speed of extracting is higher.

In practical application, there are quite a number of redundant points in the feature points extracted from two images. If these redundant feature points are not removed, error of the matching parameters will be caused, and even the matching failure may be caused. Selecting proper point matching criterion to find the corresponding feature point pairs is important for realizing validity and accuracy of image registration. The common corner matching algorithms include the Hausdorff distance algorithm, the relaxation labeling algorithm, the deterministic annealing algorithm and the iterative closest point algorithm.

The corner matching algorithm provided by the embodiments of the disclosure is divided into two steps: 1. performing rough matching with the BGCC matching algorithm; 2. purifying with the RANSAC algorithm to realize the pinpoint matching of the images. The algorithm can exactly extract the correct matching feature point pairs while removing the redundant feature points.

The second extracting sub-module is configured to use the NCC to extract the initial feature point pairs by the BGCC matching algorithm. Specifically, the second extracting sub-module is configured to:

establish a similarity measure NCC, wherein the matching is deemed successful only when both of two corners have the maximum value of similarity measure with respect to each other.

The correlation coefficient is defined as follows:

$$C_{ij} = \sum_{k=-n}^{n} \sum_{l=-n}^{n} \frac{[I_1(u_i^1+k, v_i^1+l) - \bar{I}_1(u_i^1, v_i^1)] \times [I_2(u_j^2+k, v_j^2+l) - \bar{I}_2(u_j^2, v_j^2)]}{(2n+1)(2n+1)\sqrt{\sigma_i^2(I_1) \times \sigma_j^2(I_2)}}, \quad \text{(formula 5)}$$

wherein $I_1$ and $I_2$ are grey levels of two images, n×n is size of the window, setting that the corners in the first image are di, wherein i=1 ... m, and the corners in the second image are dj, wherein j=1 ... n, then $(u_i^1, v_i^1)$ and $(u_j^2, v_j^2)$ are respectively the ith feature point and the jth feature point to be matched in the two images; $\bar{I}(u,v)$ is an average grey level value of the corner window area:

$$\bar{I}(u, v) = \frac{\sum_{i=-n}^{n} \sum_{j=-n}^{n} I(u+i, v+j)}{(2n+1)(2n+1)}, \quad \text{(formula 6)}$$

and standard deviation σ of the window area is:

$$\sigma = \sqrt{\frac{\sum_{i=-n}^{n} \sum_{j=-n}^{n} I^2(u+i, v+j)}{(2n+1)(2n+1)} - \bar{I}^2(u, v)}. \quad \text{(formula 7)}$$

Performing rough matching with the BGCC matching algorithm specifically includes the following steps.

Step 1: selecting a related window with size of n×n centring on any corner in image $I_1$, selecting a rectangular search area with size of dl×dh centring on a pixel in image $I_2$ with the same coordinates as the given corner in image $I_1$, then performing calculation of correlation coefficient $C_{ij}$ to the given corner in image $I_1$ and each corner in the search window area in image $I_2$, and taking the corner with the maximum correlation coefficient as the matching point of the given corner in image $I_1$. In this way, a set of matching points can be obtained.

Step 2: similarly, setting any corner in image $I_2$ as the given corner in image $I_2$, and searching for the corner with the maximum correlation coefficient in the corresponding window area in image $I_1$ as the matching point of the given corner in image $I_2$. In this way, another set of matching points can be obtained.

Step 3: finally, searching for the pairs of same matching corners in the obtained two sets of matching points, and confirming that the pairs of the corners are matching and corresponding to each other. Then, the initial matching of corners is completed.

In practical application, for compensating the difference generated due to light of two images, the embodiments of the disclosure smooth the images with a 7×7 median filter. Then, the result obtained from subtraction of the original images and the filtered images is taken as the object for operation.

If only the BGCC matching algorithm is used to perform the matching, wrong matching pairs will be generated. Sometimes, the ratio of wrong matching is very high, which seriously interferes with the estimation of transformation matrix and causes the failure of image registration. Thus, it is necessary to correct the feature points and remove the wrong matching pairs. The embodiments of the disclosure adopt the RANSAC algorithm to perform the pinpoint matching.

Specifically, the obtaining sub-module is configured to get rid of the pseudo feature point pairs through the RANSAC algorithm to obtain the exactly matching feature point pairs.

In the RANSAC algorithm, first, a certain target function is designed based on the specific problem; then, the initial values of parameters in the function is estimated by repeatedly extracting the set of the smallest points, and all the data is divided into inliers (namely, the points meeting the estimated parameters) and outliers (namely, the points not meeting the estimated parameters) according to these initial values of parameters; finally, the parameters of the function are recalculated and re-estimated with all inliers. Specifically, the following processing is included: sampling the set of the smallest points in the input data, estimating the parameters to be determined by using the set of the smallest points obtained from each sampling, and in this case, determining, according to a certain determining criterion, which data in the input data is consistent with the set of parameters, namely the inliers, and which is not, namely the outliers. After iterating like this for a number of times, the estimated values of parameters with the highest ratio of inliers in the corresponding input data is regarded as the final estimated values of parameters.

The process of the RANSAC algorithm is described below in detail.

Step 1: repeating random sampling for N times.

Step 2: randomly selecting 4 pairs of matching points (the selected 4 pairs of matching points should satisfy that any three points in the sample are not on the same straight line), and linearly calculating a projection transformation matrix H.

Step 3: calculating the distance from each matching point to the corresponding matching point after matrix transformation.

Step 4: calculating the inliers of the projection transformation matrix H based on the principle that the distance of the inliers is less than a distance threshold t, selecting a point set which includes the most inliers, and re-estimating the projection transformation matrix H in this inlier area.

Figure 4:
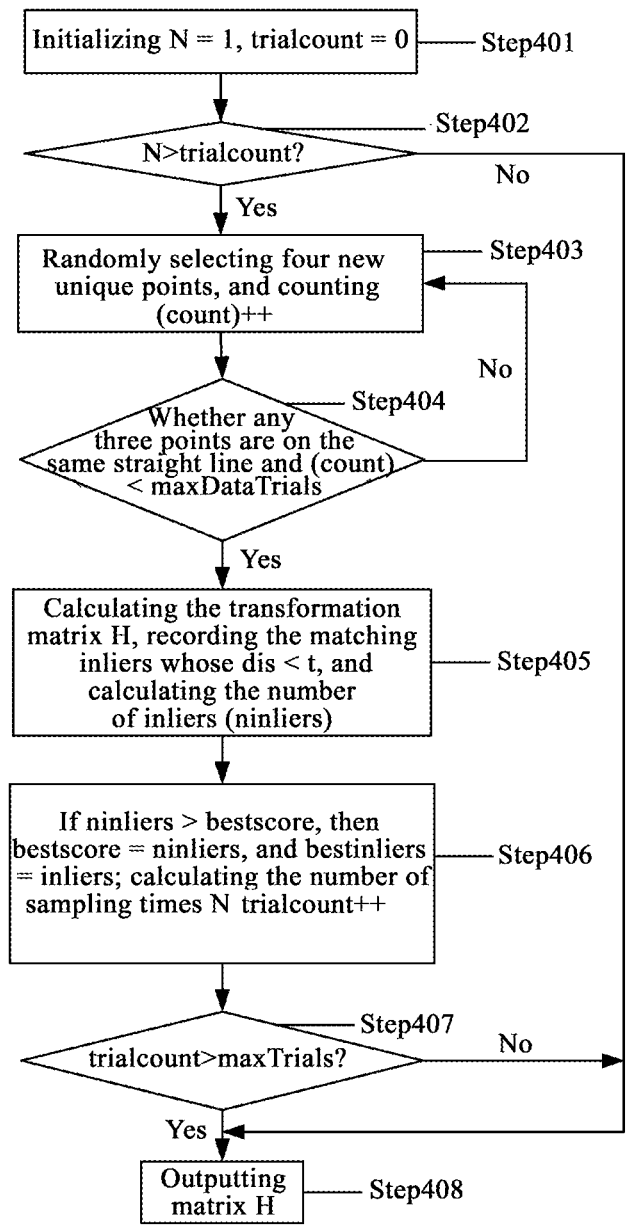
FIG. 4 shows a detailed flowchart of the Random Sample Consensus (RANSAC) algorithm according to an embodiment of the disclosure.

FIG. 4 shows a detailed flowchart of the RANSAC algorithm according to an embodiment of the disclosure. As shown in FIG. 4, the flow includes the following processing.

Step 401: initializing N=1, and initializing trialcount=0.

Step 402: determining whether N is greater than trialcount; and if yes, executing step 403; otherwise, executing step 408.

Step 403: randomly selecting four new unique points, and count++.

Step 404: determining whether any three points are on the same straight line and count is less than maxDataTrials; and if yes, executing step 405; otherwise, executing step 403.

Step 405: calculating the transformation matrix H, recording the inliers whose dis is less than t, and calculating the number of inliers (ninliers).

Step 406: if ninliers is greater than bestscore, then bestscore is equal to ninliers, and bestinliers is equal to inliers; calculating the number of sampling times N, and trialcount++.

Step 407: determining whether trialcount is greater than maxTrials; and if yes, executing step 408; otherwise, executing step 402.

Step 408: outputting the matrix H.

Figure 5:
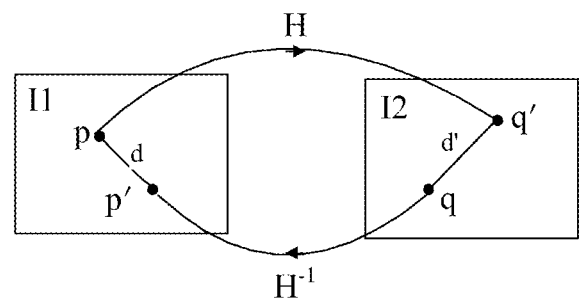
FIG. 5 shows a diagram of a geometrical distance according to an embodiment of the disclosure.

In the above algorithm, a geometrical distance between an actual matching point and an estimated matching point is used as the determining criterion to determine the correct matching points, namely the inliers. FIG. 5 shows a diagram of the geometrical distance according to an embodiment of the disclosure. As shown in FIG. 5, setting p' and q' are the estimated corresponding points of points p and q in each corresponding image respectively, then the geometrical distance from an actual matching point of a point in the image to its estimated matching point is defined as follows:

$$d(p,p')=d(p,H^{-1}q)=\|p-H^{-1}q\|, d'(q,q')=d(q,Hp)=\|q-Hp\| \quad \text{(formula 8)},$$

wherein $\|\bullet\|$ represents the Euclidean distance. In view of symmetry, the determining criterion function of the geometrical distance is defined as follows:

$$dis = \sum_{i=1}^{n} (d_i(p_i, p'_i)^2 + d'_i(q_i, q'_i)^2) = \quad \text{(formula 9)}$$

$$\sum_{i=1}^{n} (\|p_i - H^{-1}q_i\|^2 + \|q_i - Hp_i\|^2).$$

If the calculated dis is greater than the given distance threshold, then the corresponding matching points are regarded as outliers. If the calculated dis is less than the set distance threshold, then the corresponding matching points are regarded as inliers. Only the inliers are suitable for calculating the transformation matrix H.

The transforming sub-module is configured to perform the inverse mapping transformation to the multiple original images according to the projection transformation matrix, transform the multiple original images to the coordinate system of the reference image, and perform image registration according to the exactly matching feature point pairs.

The explanation about RANSAC algorithm is described below.

1. There is a normalized coordinate system. The estimated transformation matrix in this coordinate system is superior to that in other coordinate system. The stability of the algorithm can be improved and the noise interference can be decreased by performing normalized processing to the data. The normalized transformation includes: 1, performing displacement transformation to the image points, so that the origin of the image is at the centroid of the set of image points; 2, performing scaling transformation to the image points, so that the image points are distributed in a circle centring on the centroid with a radius of $\sqrt{2}$. The normalized transformation matrix composed of translation transformation and scale transformation is defined as $T_{norm}=T_{tran}T_{scale}$.

The translation transformation is $$T_{tran} = \begin{pmatrix} 1 & 0 & -\bar{x} \\ 0 & 1 & -\bar{y} \\ 0 & 0 & 1 \end{pmatrix},$$

wherein $\bar{x}$ and $\bar{y}$ are the average values of the set of points.

The scale transformation is $$T_{scale} = \begin{pmatrix} \frac{\sqrt{2}}{rms} & 0 & 0 \\ 0 & \frac{\sqrt{2}}{rms} & 0 \\ 0 & 0 & 1 \end{pmatrix},$$

wherein $$rms = \frac{1}{n}\sqrt{\sum_{i=1}^{n}(x_i - \bar{x})^2 + (y_i - \bar{y})^2} \; ; \quad \text{(formula 10)}$$

$$p_{norm} = T_{norm}p_i \quad T_{norm} = \begin{pmatrix} x_i \\ y_i \\ 1 \end{pmatrix}.$$

In formula 10, i represents the ith corner.

2. The embodiments of the disclosure may adopt the Direct Linear Transformation (DLT) algorithm to estimate the transformation matrix. The algorithm can obtain more accurate parameters. Solving projection transformation parameters at least needs eight equations. That is, it is required to select n (n is greater than or equal to 4) corresponding feature point pairs in the adjacent two images. The feature point pairs can be obtained through the above corner matching process. It is set that the projection transformation between the images $I_1$ and $I_2$ is (in homogeneous coordinates):

$$\begin{pmatrix} x_i' \\ y_i' \\ w_i' \end{pmatrix} = \begin{pmatrix} h_0 & h_3 & h_6 \\ h_1 & h_4 & h_7 \\ h_2 & h_5 & h_8 \end{pmatrix} \begin{pmatrix} x_i \\ y_i \\ w_i \end{pmatrix}. \quad \text{(formula 11)}$$

It can be expressed through a cross product equation as: $X_i' \times HX_i = 0$, wherein $X_i' = (x_i', y_i', w_i')^T$.

Making $h_j^T$ represent the jth line of the H, then the cross product equation can be expressed as $Ah=0$, that is:

$$\begin{pmatrix} 0^T & -w_i'X_i^T & y_i'X_i^T \\ w_i'X_i^T & 0^T & -x_i'X_i^T \\ -y_i'X_i^T & x_i'X_i^T & 0^T \end{pmatrix} \begin{pmatrix} h_1 \\ h_2 \\ h_3 \end{pmatrix} = 0. \quad \text{(formula 12)}$$

In practice, by performing the Singular Value Decomposition (SVD) to A, the solution of h is the value of V.

After the transformation parameters between/among images are exactly calculated, the image combining module 16 is required to stitch the multiple original images into a large panoramic image according to the solved parameters. For obtaining the combined image, it is needed to select a proper image combining strategy to finish the stitching of images. The combination of images is to combine the pixels of the original images to generate pixels on the stitching plane to realize natural transition between adjacent images. Because the result of the image registration has registration error, accurate registration cannot be achieved at each point. Thus, the image combining strategy is required to reduce as many influences of the remained deformation and the luminance difference among images on the effect of combination as possible, so as to obtain more accurate, more comprehensive and more reliable image description of the same scene. The combination of images includes drawing the stitched image, adjusting and mixing luminosity, determining the overlapping area and eliminating the seams.

Specifically, the image combining module 16 is configured to obtain the space transformation relationship among/between the multiple original images according to the coordinate system of the reference image, select a proper image combining strategy, and complete the combination of images.

For making the stitch area smooth so as to ensure the quality of the image, the embodiments of the disclosure adopt an improved easing-in-and-easing-out method of combining.

In the related art, grey level values f(x,y) of pixels in the overlapping area of images are obtained by performing weighted average to the grey level values f1(x,y) and f2(x,y) of corresponding pixels in the two images:

$$f(x,y)=d1 \times f1(x,y)+d2 \times f2(x,y) \quad \text{(formula 13)},$$

wherein d1 and d2 are gradient factors with a value range between 0 and 1, and satisfy: d1+d2=1. In the overlapping area, in the direction from the first image to the second image, d1 gradually changes from 1 to 0, d2 gradually changes from 0 to 1, and f1(x,y) transits to f2(x,y) smoothly and slowly.

It is found when using the algorithm that although boundary in the processed image is eliminated, ghosting and fuzziness still occurs in the overlapping area. Because there are large differences of grey level values among individual corresponding pixels in the overlapping area of the two images, the grey level values of these pixels in the combined image abruptly change. For overcoming such a situation, embodiments of the disclosure improve the above algorithm, specifically including: a threshold door is introduced. For f(x,y), instead of directly performing weighted average to f1(x,y) and f2(x,y), first the difference between grey level values of corresponding pixels of the point in two images before smoothing is calculated. If the difference is less than the threshold, the weighted average is taken as the grey level value of the point. Otherwise, the grey level value before smoothing is taken as the grey level value of the point.

The pixel f(x,y) of the image combined through the algorithm improved by the embodiments of the disclosure can be expressed as:

$$f(x,y) = \begin{cases} f_1(x,y) & (x,y) \in f_1 \\ f_1(x,y) & |f_1 - f_2| > \text{door}, \\ & d_1 > d_2, (x,y) \in (f_1 \cap f_2) \\ d_1 \times f_1(x,y) + d_2 \times f_2(x,y) & |f_1 - f_2| < \text{door}, \\ & (x,y) \in (f_1 \cap f_2) \\ f_2(x,y) & |f_1 - f_2| > \text{door}, \\ & d_1 < d_2, (x,y) \in (f_1 \cap f_2) \\ f_2(x,y) & (x,y) \in f_2. \end{cases} \quad \text{(formula 14)}$$

Figure 6:
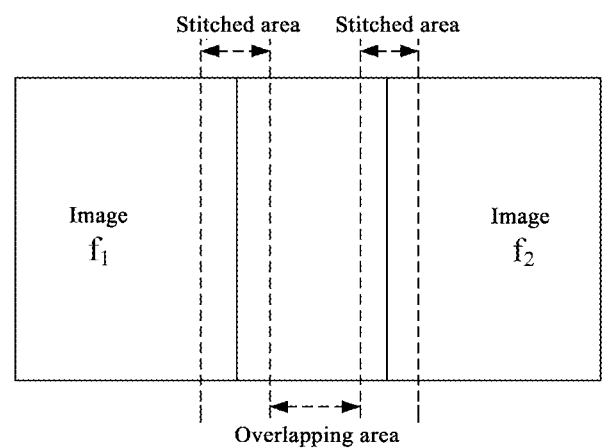
FIG. 6 shows a diagram of an image combining algorithm according to an embodiment of the disclosure.

FIG. 6 shows a diagram of an image combining algorithm according to an embodiment of the disclosure. As shown in FIG. 6, image f1 and image f2 have a stitching area and an overlapping area. Generally speaking, if the selected stitching area and overlapping area are oversized, there will be problems that the image is blurred and that the edge information is not obvious. If the selected stitching area and overlapping area are undersized, the seams of image cannot be eliminated. After many experiments, it is shown that the 7×7 area around the seams can be used as a seam processing area, and the 3×3 template can be adopted to perform linear filtering to the pixels in the seam area. By doing so, the best effect is achieved.

It should be noted that in the embodiments of the disclosure, the image pre-processing module, the image registration module and the image combining module can compose an image stitching module. In practical application, the image stitching module and a central control module share the same hardware carrier. The image stitching module adopts the digital image processing technology to stitch images, and can serve as a completely encapsulated entity in the central control module. The result of stitching is stored in a storage module. The user can obtain the stitched panoramic picture directly from the storage module. Preferably, the storage module includes an internal storage and an external expanded storage of the mobile phone. In practical application, a selecting option for the image stitching can be set on mobile device for user to select the storage module, and for displaying stitched the stitched image obtained by the image stitching module for user to preview.

In the embodiment, the image combining algorithm can be directly integrated in the mobile device. As long as the mobile device can be used for normal photographing, the combination of images of different angles and different directions can be realized on the mobile device by using the image combining algorithm according to the embodiments of the disclosure. Thus, the demands of users are satisfied more accurately and conveniently without increasing any expensive hardware resource.

Method Embodiments

Figure 7:
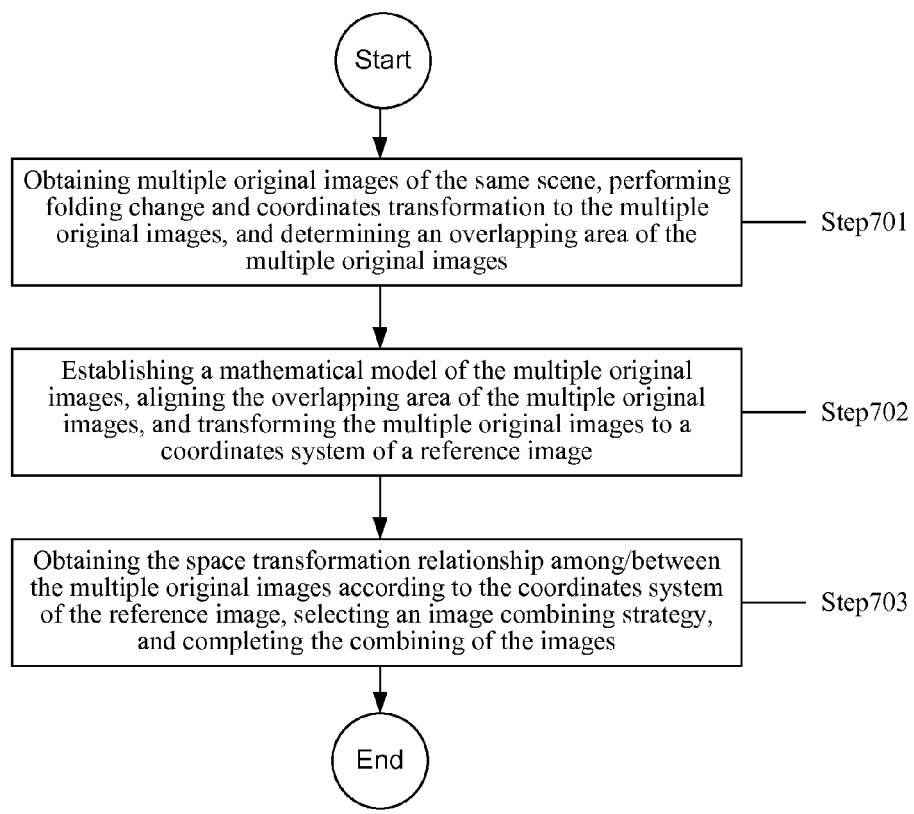
FIG. 7 shows a flowchart of a method for combining panoramic image according to an embodiment of the disclosure.

According to an embodiment of the disclosure, a method for combining panoramic image is provided, which is used for the camera of the mobile device. FIG. 7 shows a flowchart of a method for combining panoramic image according to an embodiment of the disclosure. As shown in FIG. 7, the method for combining panoramic image according to an embodiment of the disclosure includes the following processing.

Step 701: obtaining multiple original images of the same scene, performing folding change and coordinates transformation to the multiple original images, and determining the overlapping area of the multiple original images.

It can be seen from the diagram of a flow of stitching panoramic image shown in FIG. 2 that obtaining the images is the first step of image processing. For obtaining the pictures to be taken, the corresponding camera device including a camera and a drive is needed. After turning on the camera, the image information acquired by the camera is transmitted to the image pre-processing module. Then, the image pre-processing module performs analytical processing to the acquired image information to verify the image information. It should be noted that in practical application, different ways of acquiring image will cause different input original images, so that the finally-used image stitching method will also be different.

The image pre-processing aims to ensure the accuracy of image registration. The image pre-processing module is configured to perform basic image processing operations to the multiple original images, establish a matching template of the images, perform predetermined transformation to the images, extract a set of feature points of the images, and determine the overlapping area of the multiple original images. The basic image processing operations include: the histogram processing and the smooth filtering of the image. The predetermined transformation includes at least one of the following: the Fourier transformation, the wavelet transformation, and the Gabor transformation.

That is to say, the image pre-processing module needs to perform some folding change and coordinates transformation to the original images, including the basic image processing operations (e.g., histogram processing, smooth filtering of image etc.), the operations of establishing the matching template of the images, performing a certain transformation (e.g. Fourier transformation, wavelet transformation, Gabor transformation etc.), extracting a set of feature points of the images etc. The image pre-processing module performs rough locating to find an approximate overlapping area, so as to reduce the matching range and improve the image combining speed.

Step 702: establishing a mathematical model of the multiple original images, aligning the overlapping area of the multiple original images, and transforming the multiple original images to the coordinate system of the reference image.

The core objective of image registration is to search for a transformation and find the corresponding position of the template or the feature points of the images to be stitched in the reference image. According to the template or the correspondence between the features of the images, the parameter values in the mathematical model can be calculated, thereby establishing the mathematical model of the two images, matching the overlapping parts of the images, and transforming the images to be stitched to the coordinate system of the reference image. Thus, a complete image can be constructed. The key of accurate registration is the mathematical model which can accurately describe the transformation relationship between two images.

In step 702, the image registration module determines the transformation parameters among the images according to the similarity measure, transforms two or more images of the same scene, which are obtained from different sensors, at different visual angles and at different time, to the same coordinate system, and obtains the best matching process on pixel level. The specific implementing method is that: the embodiments of the disclosure first improve the Harris corner detection algorithm, which effectively improves speed and accuracy of extracting the feature points; then use the NCC to extract the initial feature point pairs through the BGCC matching algorithm, and get rid of the pseudo feature point pairs through the RANSAC algorithm, which realizes the exact matching of the feature point pairs; and at last, realize image registration according to the exactly matching feature point pairs.

As shown in FIG. 3, the image registration module needs to perform feature extracting, feature matching, transformation model parameter estimating, image re-sampling and transforming, and other operations to the obtained images, which specifically includes the following processing.

1. Obtaining the corresponding position of the matching template or the set of feature points of the multiple original images in the reference image, calculating each parameter value in the mathematical model according to the position, and establishing the mathematical model of the multiple original images.

2. Extracting feature points of the multiple original images in a specific way. That is to say, the geometric feature or grey level feature applicable to the image registration can be extracted according to the image attribute. Preferably, the feature points are corners in the embodiments of the disclosure.

In the related art, the corner detection algorithm is mainly divided into two types of extracting algorithms based on edge and grey level respectively. Because the extracting algorithm based on edge always depends on extraction of the edge, if an error occurs on the detected edge or the edge line is broken, then the result of extracting the corners is greatly affected. The extracting algorithm based on grey level achieves the purpose of detecting by calculating the extreme points with dramatically changing grey level and gradient in a local scope, without the need of extracting the edge. Hence, it is widely applied in practice. In the related art, the commonly used corner detection methods include the Moravec operator corner detection, the Forstner operator corner detection, the Susan detection algorithm, and the Harris corner detection algorithm. In the above, the Harris corner detection algorithm has excellent performance in consistency and validity, and the interest point extracted through the Harris corner detection algorithm is proved to have rotation invariance, translation invariance, good stability and other advantages.

The Harris corner detection algorithm determines the corners through the variance rate of gray level of image. The algorithm determines whether a point is a corner by calculating the feature value of a matrix M which is correlated with the autocorrelation function of the image, namely the first curvature of the autocorrelation function. If both of the two curvature values are high, then the point is regarded as a corner.

The Harris corner detection algorithm defines the autocorrelation value $E(u,v)$ in any direction as:

$$E(u, v) \cong [u \ v] M \begin{bmatrix} u \\ v \end{bmatrix},\quad \text{(formula 1)}$$

$$M = \begin{bmatrix} A & C \\ C & B \end{bmatrix} = e^{-\frac{x^2+y^2}{2\sigma^2}} \otimes \begin{bmatrix} I_x^2 & I_x I_y \\ I_x I_y & I_y^2 \end{bmatrix},\quad \text{(formula 2)}$$

wherein Ix and Iy are the gradient values of the image in x direction and y direction respectively, w(x,y) is Gaussian filer, and ⊗ represents the convolution operation. M is a 2×2 symmetric matrix, so that there must be two feature values $\lambda_1$ and $\lambda_2$. The feature value reflects the feature of the image pixel. That is to say, if the point (x,y) is a feature point, two feature values of M matrix about the point are positive, and they are the local maximum in an area centring on point (x,y). The feature point can be expressed by the evaluation function as:

$$R = \mathrm{Det}(M) - k\mathrm{Trace}^2(M)\quad \text{(formula 3)}$$

wherein $\mathrm{Det}(M)=\lambda_1\lambda_2$, $\mathrm{Trace}(M)=\lambda_1+\lambda_2$, Det is a determinant of the matrix, Trace is the trace of the matrix (sum of the diagonal elements of the matrix), and k is a trial value, usually ranging from 0.04 to 0.06. A reasonable threshold T is set. When the actual R value calculated through formula 3 is greater than the threshold, it indicates that a corner is found; otherwise, no corner is found. The feature point is usually a pixel corresponding to the maximum interest value in a local area. Hence, after calculating the R value of each point, it is required to perform non-maximum suppression, and extract all the points with the maximum local interest values in the original images.

It can be seen from the above process of Harris corner detection that the original Harris corner detection method in the related art is disadvantaged in setting a single threshold, low location accuracy and poor real-time performance etc. The embodiments of the disclosure improve the Harris corner detection algorithm in the related art, extract as many feature points with accurate location as possible in the images, and improve the speed of extracting the corners.

Specifically, the Harris corner detection algorithm improved by the embodiments of the disclosure includes the following processing.

Step 1: calculating the lateral first derivative and the longitudinal first derivative of each point in the image and calculating the product of the lateral first derivative and the longitudinal first derivative to obtain three new images; and during image processing, performing convolution with the original image by using a 3×3 convolution kernel to obtain the partial derivative of each point of the original image. In practical application, for reducing the influence of image noise on extracting the corners, the Gaussian filtering can be performed to the three images.

Step 2: calculating the R value of each corresponding pixel on the original image according to the corner response function formula. The k value in the corner response function formula of the original Harris corner detection algorithm is an empirical constant, and differs greatly in use. This decreases the reliability of extracting the corners, and easily influences the accuracy of extracting the corners when the conditions of the images are different. In view of the characteristic that the R value is actually a corner detection signal, and if value of determinant is great and value of trace is small, it is a corner signal, otherwise, it is an edge signal, the embodiments of the disclosure use the following ratio method to calculate the corner response function formula:

$$R = \frac{\mathrm{Det}(M)}{\mathrm{Trace}(M) + \varepsilon}.\quad \text{(formula 4)}$$

For avoiding that the trace of matrix may be zero sometimes, a very small number ε is added in the denominator. Compared with the response function in the original Harris corner detection algorithm, it avoids the selection of parameter k, decreases the randomness of the selection of k, and has advantages of high practicability, good reliability and high accuracy.

Step 3: selecting local extreme point.

The method in the related art is: selecting a proper threshold, then taking the pixels whose interest values are greater than the threshold as the feature pixels, and filtering the pixels whose interest values are less than the threshold. Although the above processing is simple and easy to realize, the selection of a single threshold may cause that part of the feature points are also filtered out for non-homogeneous images.

For overcoming the defect, the embodiments of the disclosure perform the screening of feature points in a manner of non-maximum suppression in the window of the image in combination with setting the threshold. The specific steps include: selecting a proper window in the original image, retaining the pixels with the maximum interest values in the window, deleting the other pixels in the window, and moving the window to perform screening on the whole original image. There are usually many local extreme points, and thus a reasonable threshold is set according to requirement. Several points with the maximum interest values are selected as the final result. In addition, for improving the speed of extracting, a boundary template can be utilized to remove the corners on boundary which are not effective for matching.

Step 4: locating of the corners of sub-pixel level. The embodiments of the disclosure approach the corner response function R through the quadratic polynomial of $ax^2+by^2+cxy+dx+ey+f=R(x,y)$, so as to determine the sub-pixel level exact location of the corner. An over-determined set of simultaneous equations including 6 unknowns from a to f can be established by the pixels around the detected corner. The over-determined set of simultaneous equations is solved with the least-square method. The corner of sub-pixel level corresponds to the maximum point of the quadratic polynomial.

The above-mentioned Table 1 shows the comparison of using different methods to extract the corners.

It can be seen from Table 1 that the Harris corner detection algorithm improved by the embodiments of the disclosure improves both the calculating speed and the subsequent match ratio compared with the extracting algorithm without threshold, and improves the time compared with the original Harris corner detection algorithm. Compared with the other two algorithms, the performance of the corners extracted through the Harris corner detection algorithm improved by the disclosure is better, and the speed of extracting is higher.

In practical application, there are quite a number of redundant points in the feature points extracted from two images. If these redundant feature points are not removed, error of the matching parameters will be caused, and even the matching failure may be caused. Selecting proper point matching criterion to find the corresponding feature point pairs is important for realizing validity and accuracy of image registration. The common corner matching algorithms include the Hausdorff distance algorithm, the relaxation labeling algorithm, the deterministic annealing algorithm and the iterative closest point algorithm.

The corner matching algorithm provided by the embodiments of the disclosure is divided into two steps: 1. performing rough matching with the BGCC matching algorithm; 2. purifying with the RANSAC algorithm to realize the pinpoint matching of the images. The algorithm can exactly extract the correct matching feature point pairs while removing the redundant feature points.

3. Using the NCC to extract the initial feature point pairs by the BGCC matching algorithm. Specifically, this process includes the following processing.

A similarity measure NCC is established, wherein the matching is deemed successful only when both of two corners have the maximum value of similarity measure with respect to each other.

The correlation coefficient is defined as follows:

$$C_{ij} = \sum_{k=-n}^{n}\sum_{l=-n}^{n} \frac{[I_1(u_i^1+k, v_i^1+l) - \bar{I}_1(u_i^1, v_i^1)] \times [I_2(u_j^2+k, v_j^2+l) - \bar{I}_2(u_j^2, v_j^2)]}{(2n+1)(2n+1)\sqrt{\sigma_i^2(I_1) \times \sigma_j^2(I_2)}},$$ (formula 5)

wherein $I_1$ and $I_2$ are grey levels of two images, n×n is size of the window, setting that the corners in the first image are di, wherein i=1 ... m, and the corners in the second image are dj, wherein j=1 ... n, then $(u_i^1, v_i^1)$ and $(u_j^2, v_j^2)$ are respectively the ith feature point and the jth feature point to be matched in the two images; $\bar{I}(u,v)$ is an average grey level value of the corner window area:

$$\bar{I}(u, v) = \frac{\sum_{i=-n}^{n}\sum_{j=-n}^{n} I(u+i, v+j)}{(2n+1)(2n+1)},$$ (formula 6)

and standard deviation a of the window area is:

$$\sigma = \sqrt{\frac{\sum_{i=-n}^{n}\sum_{j=-n}^{n} I^2(u+i, v+j)}{(2n+1)(2n+1)} - \bar{I}^2(u, v)}.$$ (formula 7)

Performing rough matching with the BGCC matching algorithm specifically includes the following steps.

Step 1: selecting a related window with size of n×n centring on any corner in image $I_1$, selecting a rectangular search area with size of dl×dh centring on a pixel in image $I_2$ with the same coordinates as the given corner in image $I_1$, then performing calculation of correlation coefficient $C_{ij}$ to the given corner in image $I_1$ and each corner in the search window area in image $I_2$, and taking the corner with the maximum correlation coefficient as the matching point of the given corner in image $I_1$. In this way, a set of matching points can be obtained.

Step 2: similarly, setting any corner in image $I_2$ as the given corner in image $I_2$, and searching for the corner with the maximum correlation coefficient in the corresponding window area in image $I_1$ as the matching point of the given corner in image $I_2$. In this way, another set of matching points can be obtained.

Step 3: finally, searching for the pairs of same matching corners in the obtained two sets of matching points, and confirming that the pairs of the corners are matching and corresponding to each other. Then, the initial matching of corners is completed.

In practical application, for compensating the difference generated due to light of two images, the embodiments of the disclosure smooth the images with a 7×7 median filter. Then, the result obtained from subtraction of the original images and the filtered images is taken as the object for operation.

If only the BGCC matching algorithm is used to perform the matching, wrong matching pairs will be generated. Sometimes, the ratio of wrong matching is very high, which seriously interferes with the estimation of transformation matrix and causes the failure of image registration. Thus, it is necessary to correct the feature points and remove the wrong matching pairs. The embodiments of the disclosure adopt the RANSAC algorithm to perform the pinpoint matching.

4. Getting rid of the pseudo feature point pairs through the RANSAC algorithm to obtain the exactly matching feature point pairs.

The RANSAC algorithm includes the steps of: first, designing a certain target function based on the specific problem; then, estimating the initial values of parameters in the function by repeatedly extracting the set of the smallest points, and dividing all the data into inliers (namely, the points meeting the estimated parameters) and outliers (namely, the points not meeting the estimated parameters) according to these initial values of parameters; finally, recalculating and re-estimating the parameters of the function with all inliers. Specifically, the following processing is included: sampling the set of the smallest points in the input data, estimating the parameters to be determined by using the set of the smallest points obtained from each sampling, and in this case, determining, according to a certain determining criterion, which data in the input data is consistent with the set of parameters, namely the inliers, and which is not, namely the outliers. After iteration like this for a number of times, the estimated values of parameters with the highest ratio of inliers in the corresponding input data is regarded as the final estimated values of parameters.

The process of the RANSAC algorithm is described below in detail.

Step 1: repeating random sampling for N times.

Step 2: randomly selecting 4 pairs of matching points (the selected 4 pairs of matching points should satisfy that any three points in the sample are not on the same straight line), and linearly calculating a projection transformation matrix H.

Step 3: calculating the distance from each matching point to the corresponding matching point after matrix transformation.

Step 4: calculating the inliers of the projection transformation matrix H based on the principle that the distance of the inliers is less than a distance threshold t, selecting a point set which includes the most inliers, and re-estimating the projection transformation matrix H in this inlier area.

FIG. 4 shows a detailed flowchart of the RANSAC algorithm according to an embodiment of the disclosure. As shown in FIG. 4, the flow includes the following processing.

Step 401: initializing N=1, and initializing trialcount=0.

Step 402: determining whether N is greater than trialcount; and if yes, executing step 403; otherwise, executing step 408.

Step 403: randomly selecting four new unique points, and count++.

Step 404: determining whether any three points are on the same straight line and count is less than maxDataTrials; and if yes, executing step 405; otherwise, executing step 403.

Step 405: calculating the transformation matrix H, recording the inliers whose dis is less than t, and calculating the number of inliers (ninliers).

Step 406: if ninliers is greater than bestscore, then bestscore is equal to ninliers, and bestinliers is equal to inliers; calculating the number of sampling times N, and trialcount++.

Step 407: determining whether trialcount is greater than maxTrials; and if yes, executing step 408; otherwise, executing step 402.

Step 408: outputting the matrix H.

In the above algorithm, a geometrical distance between an actual matching point and an estimated matching point is used as the determining criterion to determine the correct matching points, namely the inliers. FIG. 5 shows a diagram of the geometrical distance according to an embodiment of the disclosure. As shown in FIG. 5, setting p' and q' are the estimated corresponding points of points p and q in each corresponding image respectively, then the geometrical distance from an actual matching point of a point in the image to its estimated matching point is defined as follows:

$$d(p,p')=d(p,H^{-1}q)=\|p-H^{-1}q\|, d'(q,q')=d(q,Hp)=\|q-Hp\| \quad \text{(formula 8)},$$

wherein $\|\bullet\|$ represents the Euclidean distance. In view of symmetry, the determining criterion function of the geometrical distance is defined as follows:

$$dis = \sum_{i=1}^{n}(d_i(p_i, p_i')^2 + d_i'(q_i, q_i')^2) = \sum_{i=1}^{n}(\|p_i - H^{-1}q_i\|^2 + \|q_i - Hp_i\|^2). \quad \text{(formula 9)}$$

If the calculated dis is greater than the given distance threshold, then the corresponding matching points are regarded as outliers. If the calculated dis is less than the set distance threshold, then the corresponding matching points are regarded as inliers. Only the inliers are suitable for calculating the transformation matrix H.

5. Performing the inverse mapping transformation to the multiple original images according to the projection transformation matrix, transforming the multiple original images to the coordinate system of the reference image, and performing image registration according to the exactly matching feature point pairs.

The RANSAC algorithm is described below.

1. There is a normalized coordinate system. The estimated transformation matrix in this coordinate system is superior to that in other coordinate system. The stability of the algorithm can be improved and the noise interference can be decreased by performing normalized processing to the data. The normalized transformation includes: 1, performing displacement transformation to the image points, so that the origin of the image is at the centroid of the set of image points; 2, performing scaling transformation to the image points, so that the image points are distributed in a circle centring on the centroid with a radius of $\sqrt{2}$. The normalized transformation matrix composed of translation transformation and scale transformation is defined as $T_{norm}=T_{tran}T_{scale}$.

The translation transformation is $$T_{tran} = \begin{pmatrix} 1 & 0 & -\bar{x} \\ 0 & 1 & -\bar{y} \\ 0 & 0 & 1 \end{pmatrix},$$

wherein $\bar{x}$ and $\bar{y}$ are the average values of set of points.

The scale transformation is $$T_{scale} = \begin{pmatrix} \frac{\sqrt{2}}{rms} & 0 & 0 \\ 0 & \frac{\sqrt{2}}{rms} & 0 \\ 0 & 0 & 1 \end{pmatrix},$$

wherein $$rms = \frac{1}{n}\sqrt{\sum_{i=1}^{n}(x_i - \bar{x})^2 + (y_i - \bar{y})^2}; \quad \text{(formula 10)}$$

$$p_{norm} = T_{norm}p_i$$

$$T_{norm} = \begin{pmatrix} x_i \\ y_i \\ 1 \end{pmatrix}.$$

In formula 10, i represents the ith corner.

2. The embodiments of the disclosure may adopt the Direct Linear Transformation (DLT) algorithm to estimate the transformation matrix. The algorithm can obtain more accurate parameters. Solving projection transformation parameters at least needs eight equations. That is, it is required to select n (n is greater than or equal to 4) corresponding feature point pairs in the adjacent two images. The feature point pairs can be obtained through the above corner matching process. It is set that the projection transformation between the images $I_1$ and $I_2$ is (in homogeneous coordinates):

$$\begin{pmatrix} x_i' \\ y_i' \\ w_i' \end{pmatrix} = \begin{pmatrix} h_0 & h_3 & h_6 \\ h_1 & h_4 & h_7 \\ h_2 & h_5 & h_8 \end{pmatrix} \begin{pmatrix} x_i \\ y_i \\ w_i \end{pmatrix}. \quad \text{(formula 11)}$$

It can be expressed through a cross product equation as: $X_i' \times HX_i = 0$, wherein $X_i' = (x_i', y_i', w_i')^T$.

Making $h_j^T$ represent the jth line of the H, then the cross product equation can be expressed as Ah=0, that is:

$$\begin{pmatrix} 0^T & -w_i'X_i^T & y_i'X_i^T \\ w_i'X_i^T & 0^T & -x_i'X_i^T \\ -y_i'X_i^T & x_i'X_i^T & 0^T \end{pmatrix} \begin{pmatrix} h_1 \\ h_2 \\ h_3 \end{pmatrix} = 0. \quad \text{(formula 12)}$$

In practice, by performing the SVD to A, the solution of h is the value of V.

Step 703: obtaining the space transformation relationship among/between the multiple original images according to the coordinate system of the reference image, selecting an image combining strategy, and completing the combining of the images.

After the transformation parameters among images are exactly calculated, the image combining module 16 is required to stitch the multiple original images into a large panoramic image according to the solved parameters. For obtaining the combined image, it is needed to select a proper image combining strategy to finish the stitching of images. The combination of images is to combine the pixels of the original images to generate pixels on the stitching plane to realize natural transition between adjacent images. Because the result of the image registration has registration error, accurate registration cannot be achieved at each point. Thus, the image combining strategy is required to reduce as many influences of the remained deformation and the luminance difference among images on the effect of combination as possible, so as to obtain more accurate, more comprehensive and more reliable image description of the same scene. The combination of images includes drawing the stitched image, adjusting and mixing luminosity, determining the overlapping area and eliminating the seams.

For making the stitch area smooth so as to ensure the quality of the image, the embodiments of the disclosure adopt an improved easing-in-and-easing-out method of combining.

In the related art, grey level values f(x,y) of pixels in the overlapping area of images are obtained by performing weighted average to the grey level values f1(x,y) and f2(x,y) of corresponding pixels in the two images:

$$f(x,y)=d1\times f1(x,y)+d2\times f2(x,y) \quad \text{(formula 13)},$$

wherein d1 and d2 are gradient factors with a value range between 0 and 1, and satisfy: d1+d2=1. In the overlapping area, in the direction from the first image to the second image, d1 gradually changes from 1 to 0, d2 gradually changes from 0 to 1, and f1(x,y) transits to f2(x,y) smoothly and slowly.

It is found when using the algorithm that although boundary in the processed image is eliminated, ghosting and fuzziness still occurs in the overlapping area. Because there are large differences of grey level values among individual corresponding pixels in the overlapping area of the two images, the grey level values of these pixels in the combined image abruptly change. For overcoming such a situation, embodiments of the disclosure improve the above algorithm, specifically including: a threshold door is introduced. For f(x,y), instead of directly performing weighted average to f1(x,y) and f2(x,y), first the difference between grey level values of corresponding pixels of the point in two images before smoothing is calculated. If the difference is less than the threshold, the weighted average is taken as the grey level value of the point. Otherwise, the grey level value before smoothing is taken as the grey level value of the point.

The pixel f(x,y) of the image combined through the algorithm improved by the embodiments of the disclosure can be expressed as:

$$f(x,y) = \begin{cases} f_1(x,y) & (x,y) \in f_1 \\ f_1(x,y) & |f_1 - f_2| > \text{door}, d_1 > d_2, \\ & (x,y) \in (f_1 \cap f_2) \\ d_1 \times f_1(x,y) + & |f_1 - f_2| < \text{door}, \\ d_2 \times f_2(x,y) & (x,y) \in (f_1 \cap f_2) \\ f_2(x,y) & |f_1 - f_2| > \text{door}, d_1 < d_2, \\ & (x,y) \in (f_1 \cap f_2) \\ f_2(x,y) & (x,y) \in f_2. \end{cases} \quad \text{(formula 14)}$$

As shown in FIG. 6, image f1 and image f2 have a stitching area and an overlapping area. Generally speaking, if the selected stitching area and overlapping area are oversized, there will be problems that the image is blurred and that the edge information is not obvious. If the selected stitching area and overlapping area are undersized, the seams of image cannot be eliminated. After many experiments, it is shown that the 7×7 area around the seams can be used as a seam processing area, and the 3×3 template can be adopted to perform linear filtering to the pixels in the seam area. By doing so, the best effect is achieved.

In conclusion, the embodiments of the disclosure perform operations like registration to the multiple single images, and combine a series of single images into a panoramic image. The solutions solve the problem of the related art that picture with high resolution and large field of view cannot be obtained due to the limitation of visual angle and the size of camera of mobile device. The scene picture with large field of view can be obtained without reducing the image resolution. The embodiments of the disclosure use the processor of the camera to perform automatic matching to construct a seamless and high-definition image. Such an image has higher resolution and larger field of view than single image, so that the demands of the users of mobile device can be better satisfied.

The above preferred embodiments are disclosed to provide examples and demonstrations. Those skilled in the art shall appreciate that there may be various modifications, additions and replacements to the disclosure. Thus, the scope of the disclosure should not be limited to the above embodiments.

What is claimed is:

1. A method for combining panoramic image, which is applied to a camera of a mobile device, comprising:
    obtaining multiple original images of a same scene, performing folding change and coordinates transformation to the multiple original images, and determining an overlapping area of the multiple original images;
    establishing a mathematical model of the multiple original images, aligning the overlapping area of the multiple original images, and transforming the multiple original images to a coordinate system of a reference image; and
    obtaining a space transformation relationship among/between the multiple original images according to the coordinate system of the reference image, selecting an image combining strategy, and completing the combining of the images;
    wherein aligning the overlapping area of the multiple original images, and transforming the multiple original images to the coordinate system of the reference image comprises:
    extracting feature points of the multiple original images in a specific way;
    using a similarity measure Normalized Cross Correlation (NCC) to extract initial feature point pair(s) through a Bidirectional Greatest Correlative Coefficient (BGCC) matching algorithm;
    getting rid of pseudo feature point pair(s) through a Random Sample Consensus (RANSAC) algorithm to obtain exactly matching feature point pair(s); and
    performing an inverse mapping transformation to the multiple original images according to a projection transformation matrix, transforming the multiple original images to the coordinate system of the reference image, and performing image registration according to the exactly matching feature point pair(s).

2. The method according to claim 1, wherein performing folding change and coordinates transformation to the multiple original images, and determining the overlapping area of the multiple original images comprises:
    performing a basic image processing operation to the multiple original images, establishing a matching template of the images, performing a predetermined transformation to the images, extracting a set of feature points of the images, and determining the overlapping area of the multiple original images.

3. The method according to claim 2, wherein establishing the mathematical model of the multiple original images comprises:

obtaining a corresponding position of the matching template or the set of the feature points of the multiple original images in the reference image, calculating each parameter value in the mathematical model according to the position, and establishing the mathematical model of the multiple original images.

4. The method according to claim 1, wherein the feature points are corners, and the specific way is a corner detection algorithm; and extracting the feature points of the multiple original images in the specific way comprises:

calculating a lateral first derivative and a longitudinal first derivative of each point in each original image of the multiple original images, and calculating a product of the lateral first derivative and the longitudinal first derivative to obtain three new images corresponding to the each original image, performing convolution with the each original image by using a 3×3 convolution kernel to obtain a partial derivative of the each point of the each original image, and performing Gaussian filtering to the three new images;

calculating an R value of each corresponding pixel of the each original image according to a corner response function formula, formula 1, $$R = \frac{\text{Det}(M)}{\text{Trace}(M) + \varepsilon}, \quad \text{formula 1}$$

wherein $\text{Det}(M) = \lambda_1 \lambda_2$, $\text{Trace}(M) = \lambda_1 + \lambda_2$, M is a 2×2 symmetric matrix, $\lambda_1$ and $\lambda_2$ are two feature values of M, and $\varepsilon$ is a number with small value;

selecting a proper window in the each original image, retaining the pixel with the maximum interest value in the window, deleting other pixels in the window, moving the window to perform screening on the whole each original image, selecting one or more point(s) with the maximum interest value(s) as local extreme point(s) according to a preset threshold, and using a boundary template to remove the corner(s) on boundary with low matching effect; and performing sub-pixel locating of the corners by using a quadratic polynomial of $ax^2 + by^2 + cxy + dy + ey + f = R(x, y)$.

5. The method according to claim 4, wherein using the similarity measure NCC to extract the initial feature point pair(s) through the BGCC matching algorithm comprises:

establishing the similarity measure NCC according to formula 2, $$C_{ij} = \sum_{k=-n}^{n} \sum_{l=-n}^{n} \frac{[I_1(u_i^1 + k, v_i^1 + l) - \bar{I}_1(u_i^1, v_i^1)] \times [I_2(u_j^2 + k, v_j^2 + l) - \bar{I}_2(u_j^2, v_j^2)]}{(2n+1)(2n+1)\sqrt{\sigma_i^2(I_1) \times \sigma_j^2(I_2)}}, \quad \text{formula 2}$$

wherein $I_1$ and $I_2$ are grey levels of two images, n×n is size of the window, setting that the corners in a first image are di, wherein i=1 ... m, and the corners in a second image are dj, wherein j=1 ... n, then $(u_i^1, v_i^1)$ and $(u_j^2, v_j^2)$ are respectively the ith feature point and the jth feature point to be matched in the two images, $\bar{I}(u,v)$ is an average grey level value of a corner window area, wherein $$\bar{I}(u, v) = \frac{\sum_{i=-n}^{n} \sum_{j=-n}^{n} I(u+i, v+j)}{(2n+1)(2n+1)},$$

and standard deviation $\sigma$ of the window area is $$\sigma = \sqrt{\frac{\sum_{i=-n}^{n} \sum_{j=-n}^{n} I^2(u+i, v+j)}{(2n+1)(2n+1)} - \bar{I}^2(u, v)};$$

selecting a related window with size of n×n centring on any corner in image $I_1$, selecting a rectangular search area with size of dl×dh centring on the pixel in image $I_2$ with same coordinates as the given corner in the image $I_1$, then performing calculation of correlation coefficient $C_{ij}$ of the given corner in the image $I_1$ and each corner in the search window area in the image $I_2$, and taking the corner with the maximum correlation coefficient as a matching point of the given corner in the image $I_1$, so as to obtain a set of the matching points;

selecting any corner in the image $I_2$ as a given corner in the image $I_2$, and searching for the corner with the maximum correlation coefficient in a corresponding window area in the image $I_1$ as a matching point of the given corner in the image $I_2$, so as to obtain another set of the matching points; and searching for a pair of same matching corners in the obtained two sets of the matching points, and completing initial matching of the corners when confirming that the pair of same matching corners are matching and corresponding to each other.

6. The method according to claim 5, wherein before establishing the similarity measure NCC according to the formula 2, the method further comprises:

smoothing the images with a 7×7 median filter, and taking a result obtained from subtraction of the original images and the filtered images as an object for operation.

7. The method according to claim 1, wherein the RANSAC algorithm comprises:

repeating random sampling for N times, wherein N is greater than or equal to 1;

randomly selecting 4 pairs of matching points, and linearly calculating the projection transformation matrix, wherein the 4 pairs of matching points ensure that any three points in the sample are not on a same straight line;

calculating a distance from each matching point to a corresponding matching point after transformation of the projection transformation matrix; and calculating inliers of the projection transformation matrix based on a principle that the distance of the inliers is less than a distance threshold t, selecting a point set which includes the most inliers, and recalculating the projection transformation matrix in this inlier area, wherein the inliers are the points that meet an estimated parameter.

8. The method according to claim 1, wherein obtaining the space transformation relationship among/between the multiple original images according to the coordinate system of the reference image, selecting the image combining strategy, and completing the combining of the images comprises:

calculating grey level values f(x,y) of pixels in the overlapping area of two images according to formula 3 and formula 4, $$f(x, y) = \begin{cases} f_1(x, y) & \\ f_1(x, y) & \\ d_1 \times f_1(x, y) + d_2 \times f_2(x, y) & \\ f_2(x, y) & \\ f_2(x, y), & \end{cases} \quad \text{formula 3}$$

$(x, y) \in f_1$      formula 4
$|f_1 - f_2| > \text{door}, d_1 > d_2, (x, y) \in (f_1 \cap f_2)$
$|f_1 - f_2| < \text{door}, (x, y) \in (f_1 \cap f_2)$
$|f_1 - f_2| > \text{door}, d_1 < d_2, (x, y) \in (f_1 \cap f_2)$
$(x, y) \in f_2,$ wherein d1 and d2 are gradient factors with a value range between 0 and 1, and satisfy: d1+d2=1, f1(x,y) and f2(x,y) are respectively the grey level values of the corresponding pixels in the two images, and door is a preset threshold.

9. An apparatus for combining panoramic image, provided in a camera of a mobile device, comprising:
   an image obtaining module, configured to obtain multiple original images of a same scene;
   an image pre-processing module, configured to perform folding change and coordinates transformation to the multiple original images, and determine an overlapping area of the multiple original images;
   an image registration module, configured to establish a mathematical model of the multiple original images, align the overlapping area of the multiple original images, and transform the multiple original images to a coordinate system of a reference image; and
   an image combining module, configured to obtain a space transformation relationship among/between the multiple original images according to the coordinate system of the reference image, select an image combining strategy, and complete the combining of the images;
   wherein the image module further comprises:
   a first extracting sub-module, configured to extract the feature points of the multiple original images in a specific way;
   a second extracting sub-module, configured to use a similarity measure Normalized Cross Correlation (NCC) to extract initial feature point pair(s) through a Bidirectional Greatest Correlative Coefficient (BGCC) matching algorithm;
   an obtaining sub-module, configured to get rid of pseudo feature point pair(s) through a Random Sample Consensus (RANSAC) algorithm to obtain exactly matching feature point pair(s); and
   a transforming sub-module, configured to perform inverse mapping transformation to the multiple original images according to a projection transformation matrix, transform the multiple original images to the coordinate system of the reference image, and perform image registration according to the exactly matching feature point pair(s).

10. The apparatus according to claim 9, wherein the image pre-processing module is further configured to:
   perform a basic image processing operation to the multiple original images, establish a matching template of the images, perform a predetermined transformation to the images, extract a set of feature points, and determine the overlapping area of the multiple original images.

11. The apparatus according to claim 9, wherein the image registration module further comprises:
   an establishing sub-module, configured to obtain a corresponding position of the matching template or the set of the feature points of the multiple original images in the reference image, calculate each parameter value in the mathematical model according to the position, and establish the mathematical model of the multiple original images.

12. The apparatus according to claim 9, wherein the feature points are corners, and the specific way is a corner detection algorithm.

13. The apparatus according to claim 12, wherein the first extracting sub-module is further configured to:
   calculate a lateral first derivative and a longitudinal first derivative of each point in each original image of the multiple original images and calculate a product of the lateral first derivative and the longitudinal first derivative to obtain three new images corresponding to the each original image, perform convolution with the each original image by using a 3×3 convolution kernel to obtain a partial derivative of the each point of the each original image, and perform Gaussian filtering to the three new images;
   calculate a R value of each corresponding pixel on the each original image according to a corner response function formula, namely formula 5, $$R = \frac{\text{Det}(M)}{\text{Trace}(M) + \varepsilon}, \quad \text{formula 5}$$

where $\text{Det}(M) = \lambda_1 \lambda_2$, $\text{Trace}(M) = \lambda_1 + \lambda_2$, M is a 2×2 symmetric matrix, $\lambda_1$ and $\lambda_2$ are two feature values of M, and $\epsilon$ is a number with small value;
   select a proper window in the each original image, retain the pixel with the maximum interest value in the window, delete other pixels in the window, move the window to perform screening on the whole each original image, select one or more point(s) with the maximum interest value(s) as local extreme point(s) according to a preset threshold, and use a boundary template to remove the corner(s) on boundary with low matching effect; and
   use a quadratic polynomial of $ax^2+by^2+cxy++ey+f=R(x,y)$ to perform sub-pixel locating of the corners.

14. The apparatus according to claim 13, wherein the second extracting sub-module is further configured to:
   establish the similarity measure NCC according to formula 6, $$C_{ij} = \sum_{k=-n}^{n} \sum_{l=-n}^{n} \frac{[I_1(u_i^1+k, v_i^1+l) - \bar{I}_1(u_i^1, v_i^1)] \times [I_2(u_j^2+k, v_j^2+l) - \bar{I}_2(u_j^2, v_j^2)]}{(2n+1)(2n+1)\sqrt{\sigma_i^2(I_1) \times \sigma_j^2(I_2)}}, \quad \text{formula 6}$$

wherein $I_1$ and $I_2$ are grey levels of two images, n×n is size of the window, setting that the corners in a first image are di, wherein i=1 . . . m, and the corners in a second image are dj, wherein j=1 . . . n, then $(u_i^1, v_i^1)$ and $(u_j^2, v_j^2)$ are respectively the ith feature point and the jth feature point to be matched in the two images, $\bar{I}(u,v)$ is an average grey level value of a corner window area, wherein $$\bar{I}(u,v) = \frac{\sum_{i=-n}^{n}\sum_{j=-n}^{n} I(u+i, v+j)}{(2n+1)(2n+1)},$$

and standard deviation σ of the window area is $$\sigma = \sqrt{\frac{\sum_{i=-n}^{n}\sum_{j=-n}^{n} I^2(u+i, v+j)}{(2n+1)(2n+1)} - \bar{I}^2(u,v)};$$

select a related window with size of n×n centring on any corner in image $I_1$, select a rectangular search area with size of dl×dh centring on the pixel in image $I_2$ with same coordinates as the given corner in the image $I_1$, then perform calculation of correlation coefficient $C_{ij}$ of the given corner in the image $I_1$ and each corner in the search window area in the image $I_2$, and take the corner with the maximum correlation coefficient as a matching point of the given corner in the image $I_1$, so as to obtain a set of the matching points;

select any corner in the image $I_2$ as the given corner in the image $I_2$, and search for the corner with the maximum correlation coefficient in the corresponding window area in the image $I_1$ as the matching point of the given corner in the image $I_2$, so as to obtain another set of the matching points; and search for a pair of same matching corners in the obtained two sets of the matching points, and complete initial matching of the corners when confirming that the pair of same matching corners are matching and corresponding to each other.

15. The apparatus according to claim 9, wherein the obtaining sub-module is further configured to:

repeat random sampling for N times, wherein N is greater than or equal to 1;

randomly select 4 pairs of matching points, and linearly calculate the projection transformation matrix, wherein the 4 pairs of matching points should ensure that any three points in the sample are not on a same straight line;

calculate a distance from each matching point to a corresponding matching point after transformation of the projection transformation matrix; and calculate inliers of the projection transformation matrix based on a principle that the distance of the inliers is less than a distance threshold t, select a point set which includes the most inliers, and recalculate the projection transformation matrix in this inlier area, wherein the inliers are the points that meeting a estimated parameter.

16. The apparatus according to claim 9 wherein the image combining module is further configured to:

calculate grey level values f(x,y) of pixels in the overlapping area of two images according to formula 7 and formula 8, $$f(x,y) = \begin{cases} f_1(x,y) \\ f_1(x,y) \\ d_1 \times f_1(x,y) + d_2 \times f_2(x,y) \\ f_2(x,y) \\ f_2(x,y), \end{cases} \quad \text{formula 7}$$

$$\begin{aligned}&(x,y) \in f_1 &&\text{formula 8}\\&|f_1 - f_2| > \text{door}, d_1 > d_2, (x,y) \in (f_1 \cap f_2)\\&|f_1 - f_2| < \text{door}, (x,y) \in (f_1 \cap f_2)\\&|f_1 - f_2| > \text{door}, d_1 < d_2, (x,y) \in (f_1 \cap f_2)\\&(x,y) \in f_2,\end{aligned}$$

wherein d1 and d2 are gradient factors with a value range between 0 and 1, and satisfy: d1+d2=1, f1(x,y) and f2(x,y) are respectively the grey level values of the corresponding pixels in the two images, and door is a preset threshold.

\* \* \* \* \*